United States Patent [19]

Shimano

[11] 4,441,638
[45] Apr. 10, 1984

[54] WATER BOTTLE FOR A BICYCLE

[75] Inventor: Keizo Shimano, Sakai, Japan

[73] Assignee: Shimano Industrial Company Limited, Osaka, Japan

[21] Appl. No.: 470,069

[22] Filed: Feb. 28, 1983

Related U.S. Application Data

[63] Continuation of Ser. No. 248,200, Mar. 27, 1981, abandoned.

[30] Foreign Application Priority Data

Mar. 31, 1980 [JP] Japan ............................ 55-43862[U]

[51] Int. Cl.³ ............................................. B62J 11/00
[52] U.S. Cl. .................................. 224/35; 224/30 R; 224/39; 248/311.2; 248/313; 280/289 R
[58] Field of Search ............... 224/148, 30 R, 35, 39, 224/32 R, 37; D9/367, 392, 499; 222/610, 608, 609; 280/289 R, 289 A; 248/218.4, 219.4, 311.2, 313

[56] References Cited

U.S. PATENT DOCUMENTS

| 4,213,592 | 7/1980 | Lingenfelser | 248/313 |
| 4,334,642 | 6/1982 | Reisch | 224/39 |
| 4,386,721 | 6/1983 | Shimano | 248/313 X |

FOREIGN PATENT DOCUMENTS

| 2411134 | 9/1975 | Fed. Rep. of Germany | 248/311.2 |
| 783438 | 7/1935 | France | 248/313 |
| 1299365 | 12/1972 | United Kingdom | 248/311.2 |

*Primary Examiner*—Allan N. Shoap
*Attorney, Agent, or Firm*—Stevens, Davis, Miller & Mosher

[57] ABSTRACT

A water-bottle mounted along the bicycle frame, in which a body is of a block-like shape and thin, a pair of side walls extending longitudinally and vertically of the bicycle, the interval between the outer surfaces of side walls gradually decreasing from the front surface portion to the rear surface portion, and the rear surface portion is formed in a circular arc smaller in a curvature than the surface of a circular arc of the frame, so that the body is formed to be streamlined together with the frame.

3 Claims, 7 Drawing Figures

WATER BOTTLE FOR A BICYCLE

This is a continuation of application Ser. No. 248,200 filed Mar. 27, 1981 abandoned.

FIELD OF THE INVENTION

This invention relates to a water-bottle for a bicycle, and more particularly to a water-bottle mounted to a frame of the bicycle so that a cyclist can drink water during the bicycle's running.

BACKGROUND OF THE INVENTION

A usual sporting bicycle for cycling or road racing is adapted to mount a water-bottle at the bicycle frame, usually at the down tube, so that a cyclist can drink water therefrom during the bicycle's running.

The water-bottle comprises a body having a spout and cap. The body of the water-bottle is usually cylindrical with an outer diameter larger than the down tube diameter carrying the water-bottle. Such a water-bottle, when the bicycle is running, causes an air eddy current behind the same to thereby increase the air resistance against the bicycle.

The increased air resistance will hamper the high speed running efficiency particularly with a sporting bicycle and result in more fatigue to the cyclist.

SUMMARY OF THE INVENTION

An object of the invention is to provide a water-bottle mounted to a bicycle so that during the bicycle's running, no air eddy current is generated behind the water-bottle, the smooth air flow along a body of the water-bottle, thereby not increasing the air resistance against the bicycle.

The water-bottle of the invention comprises a pair of side walls extending longitudinally and vertically from the bicycle. A connecting wall is in continuation of the side walls and connecting them, the connecting wall including a front surface portion along the bicycle frame having the surface of a circular arc and a rear surface portion facing rearwardly of the bicycle. This invention is characterized in that the body has a block-shape and a small in thickness. An interval between the outer surfaces of both the side walls becomes gradually smaller from the front toward the rear and the rear surface portion of the connecting wall is curved in a circular arc with a curvature smaller than that of the bicycle frame, thus making the body together with the frame carrying it streamlined.

The body of the water-bottle of the invention is usually square, rhomboid or triangular shaped in a front view.

The aforesaid expression; "of a block shape having a small in thickness", as used above, means that the body has a longitudinal length larger than the interval between the outer surfaces of the side walls of the same, the interval being made about equal to (or slightly larger than) an external dimension of the frame in a direction perpendicular to the longitudinal direction of the bicycle, giving an overall appearance of being thin.

The water-bottle of the invention has the body constructed so as to be streamlined together with the frame. An air flow is divided at the front surface of the frame to flow along the side walls and smoothly leaves the rear side of the water-bottle body without generating an air eddy current. Hence, even when the water-bottle is mounted on the bicycle frame, an air resistance against the bicycle's running scarcely increases.

Furthermore, the body of a block-like shape smaller in thickness enables the cyclist to drink water from the water-bottle with ease by holding it between his fingers while the bottle has a desired volume. Especially, the water-bottle for the bicycle is used for drinking purposes during the bicycle's running, and the body is compressed to discharge the content through the spout by means of a pumping action. Such pumping action is easy due to the of the body having a small block-like shape thickness.

In addition, the water-bottle of the invention, as is well-known, is mounted detachably on the bicycle frame by use of a fixture, which will be apparent in accordance with an embodiment to be hereinafter detailed.

These and other objects, features and advantages of the invention will become more apparent in view a reading of the following detailed specification and drawings, in which:

DETAILED DESCRIPTION OF THE INVENTION

Figure 1:
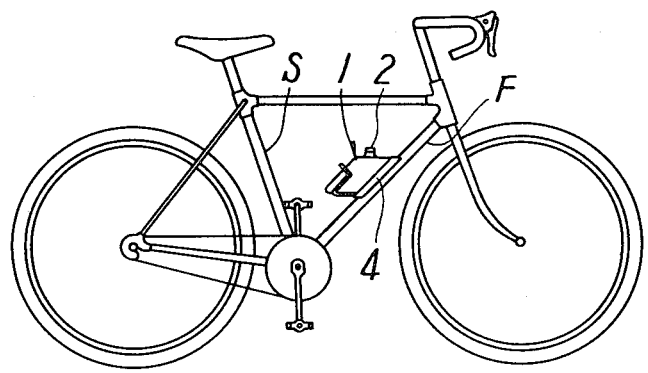
FIG. 1 is a schematic general view of a bicycle mounted with a water-bottle of the invention.
Figure 2:
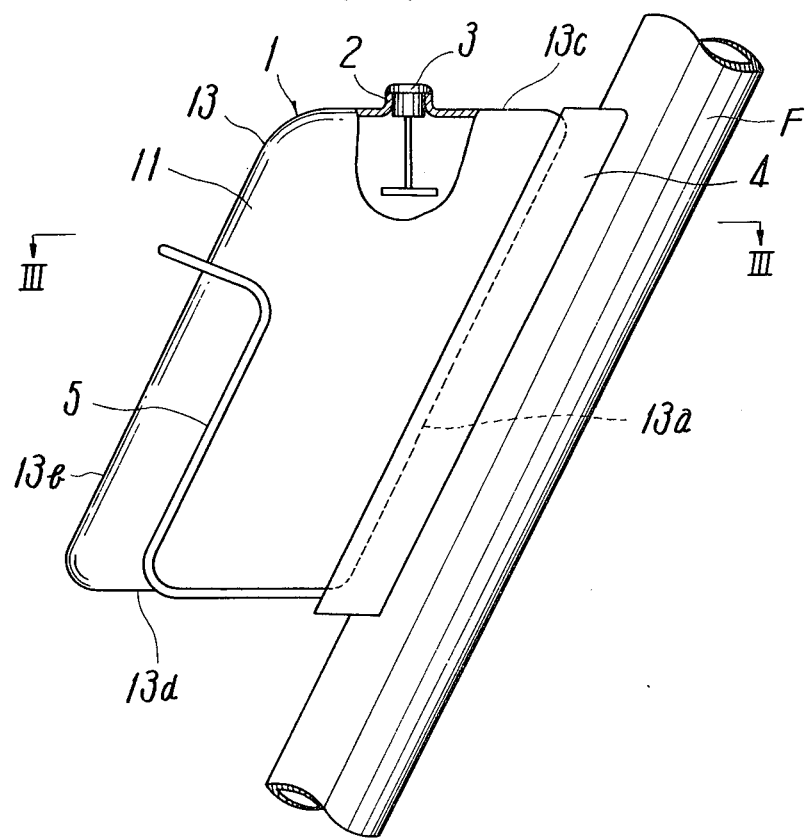
FIG. 2 is a partially cutaway front view of the water-bottle in FIG. 1, showning an enlarged mounting portion of the water-bottle.

A water-bottle of the invention shown in FIG. 1 is mounted on a down tube F of the bicycle frame and comprises a body 1 having a spout 2 and a bottle stopper 3 to open or close the spout 2 as shown in FIG. 2.

Figure 3:
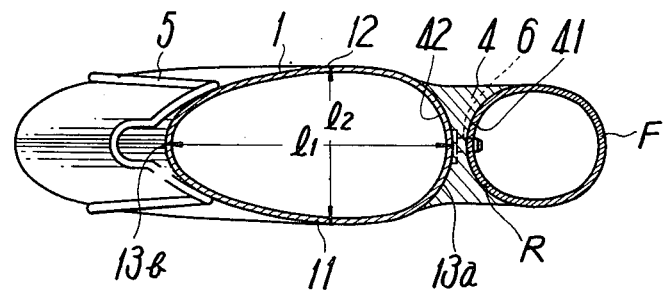
FIG. 3 is a sectional view taken on the line III—III in FIG. 2.
Figure 4:
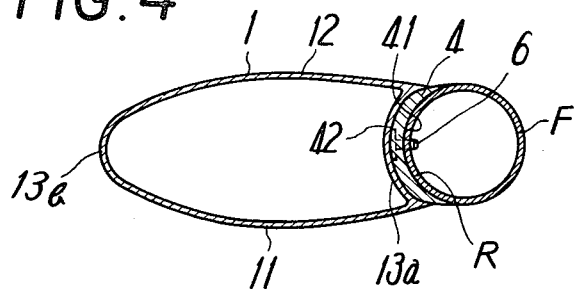
FIG. 4 is a sectional view of a modified embodiment, which corresponds to FIG. 3.

The down tube F is formed mainly of a pipe round or elliptic in section and has a surface R of a circular arc. The water-bottle is mounted on the down tube F by use of a fixing member 4. The fixing member 4, as shown in FIGS. 2 and 3, has a concave surface 41 of a curvature equal to that of the curved surface of down tube F and a support surface 42 mating with the front surface to be hereinafter described, of the water-bottle, and is fixed to the down tube F by a fixing means 6, such as a screw. As shown in FIGS. 2 and 13, the fixing member forms a housing which covers any gap which might exist between the front of the water bottle and bicycle down tube F. A support member 5 formed of a bent spring wire is fixed at the free end to the fixing member 4, and the body 1 of the water-bottle is inserted between the support surface 42 of fixing member 4 and the support member 5, thereby being press-mounted on the support surface 42 by means of a spring force of support member 5.

Figure 5:
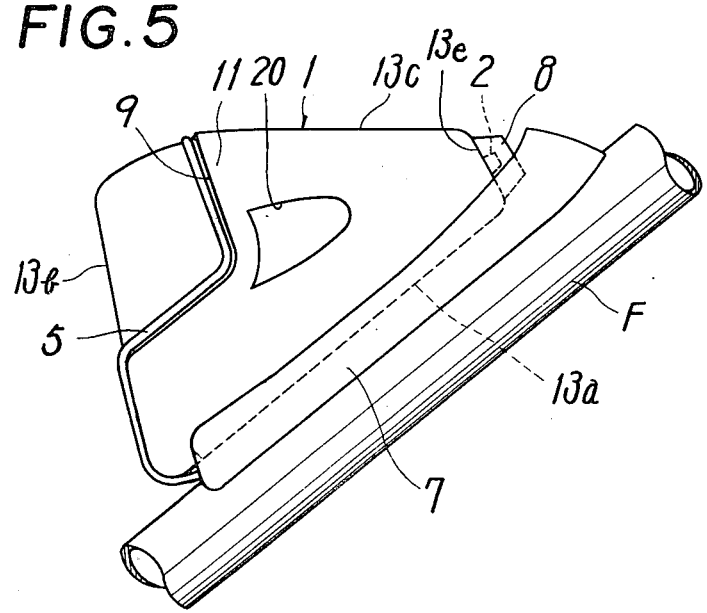
FIG. 5 is a front view of the modified embodiment.
Figure 6:
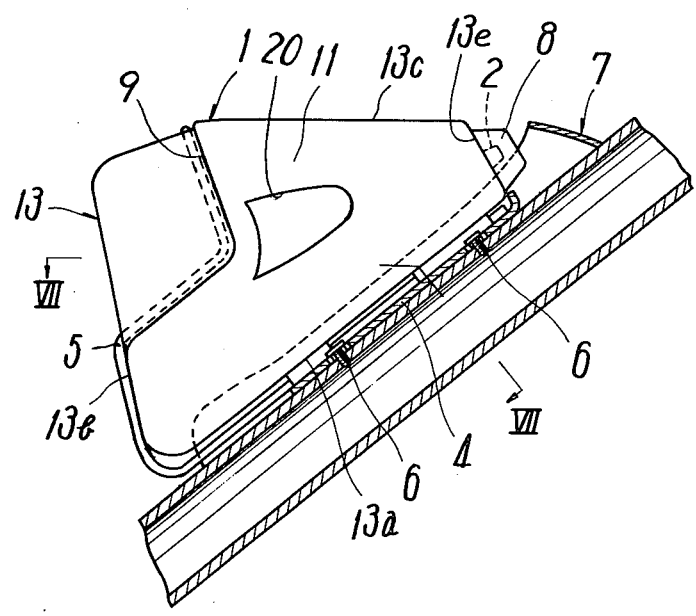
FIG. 6 is a sectional front view only of a mounting portion of the water-bottle in the FIG. 5 embodiment.
Figure 7:
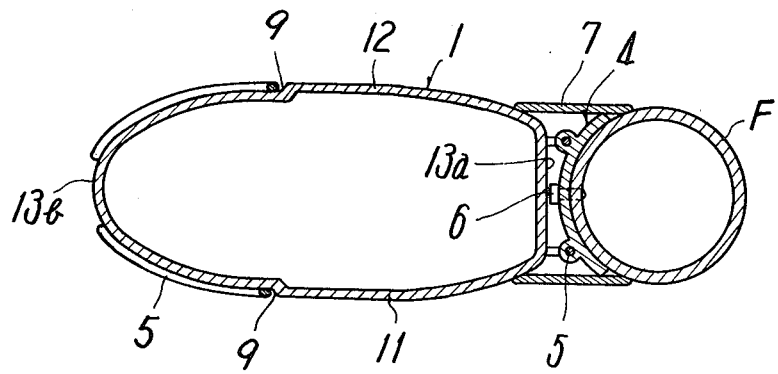
FIG. 7 is an enlarged sectional view taken on the line VII—VII in FIG. 6.

This mounting construction is well-known; which will be understandable without further detailed description. Alternatively, a frame member 7, as shown in FIGS. 6 and 7, may be integral with the fixing member 4, or separate therefrom and fixed together with the fixing member 4 to the down tube F. In this instance, the frame member 7 may receive the body 1 and the support member 5 mounts the water-bottle to the frame, or the support member 5 may use a tightening band for the mounting. In the case where the support member 5 is used, a recess 9 of a depth slightly larger than a thickness of support member 5, as shown in FIGS. 5 and 6, is provided at a side wall of the body to be hereinafter described, whereby the support member 5 does not project from the side wall.

The body 1 of the water-bottle of the invention, which is mounted on the down tube F, comprises a pair of side walls 11 and 12 extending longitudinally and vertically of the bicycle and a connecting wall 13 in continuation of the side walls 11 and 12 connecting them, the connecting wall 13 comprising a front surface portion 13a along the down tube F, a rear surface portion 13b facing rearwardly of the bicycle, and upper and lower surface portions 13c and 13d for connecting the front and rear surface portions 13a and 13b, thus forming the body 1, as a whole, of a block-like shape with a small thickness.

In other words, the body 1, as shown in FIG. 3, has a length $l_1$ longitudinal of the bicycle, larger than an interval $l_2$ between the outer surfaces of side walls 11 and 12, the interval $l_2$ being about slightly larger than an outer diameter of down tube F.

In addition, the body 1 shown in FIG. 2 is substantially rhombus-shaped in a front view, and the upper and lower surface portions 13c and 13d are horizontal and bordered on the rear surface portion 13b through curved surfaces.

The interval between the outer surfaces of side walls 11 and 12 is gradually reduced from the front surface portion 13a toward the rear surface portion 13b as shown in FIG. 3, and the rear surface portion 13b is formed in a circular arc smaller in a curvature than the round down tube F. The water-bottle constructed as foregoing, when mounted on the down tube F, is made streamlined at the exterior together with the down tube F as shown in FIG. 3.

The body 1, as shown in FIG. 3, is formed in an egg-like shape in a horizontal section, and may alternatively have the front surface portion 13a concaved in a circular arc concentric with the circular surface R of down tube F.

The water-bottle mounted on the down tube F to be streamlined shaped, is scarely affected by air resistance due to the fact that an air flow divided by the down tube F proceeds rearwardly along the other surfaces of fixing member 4 and side walls 11 and 12 and smoothly leaves them without generating an air eddy current behind the body 1. Hence, a reduced air resistance against the bicycle's running can be obtained.

Alternatively, the front view of the body 1 may be square or substantially triangualr as shown in FIGS. 5 and 6. In this instance, the front surface portion 13a continues directly with the rear surface portion 13b, the upper surface portion 13c connecting the front and rear surface portions 13a and 13b, so that the body 1 mounted on the down tube F keeps the upper surface portion 13c horizontal. At the border between the front surface portion 13a and the upper surface portion 13c, that is, at the top of the triangle, is provided a flat surface portion 13e having the spout 2.

In the aforesaid construction, it is preferable that the upper surface portion 13c is made upwardly convex, or borders the rear surface portion 13b through a curved surface.

The body 1, when formed in a substantially triangular shape, is streamline-shaped at the exterior as shown in FIG. 7. The air flows along the side walls pass rearwardly smoothly without generating an air eddy current, whereby the body 1 is less affected by the air resistance.

In addition, in FIGS. 5 and 6, reference numeral 8 designates a cap for a bottle-stopper (not shown) opening or closing the spout 2. The water-bottle alternatively may be mounted on a seat tube S.

As seen from the above, the water-bottle of the invention is so constructed that the body 1 is of a block-like shape smaller in thickness, the side walls 11 and 12 are reduced in the interval therebetween gradually from the front surface portion 13a to the rear surface portion 13b, and the rear surface portion 13b is formed in circular arc smaller in a curvature than the circular surface of the bicycle frame, such as the down tube, whereby an air resistance against the body 1 can be restricted to a minimum, thereby preventing an increase of air resistance to the bicycle's running. As a result, the cyclist can drive the bicycle at high speed in a stable condition with less fatigue even when the bicycle and water-bottle are attached.

The body 1 of a block-like shape having a small thickness can easily be held by the cyclist when drinking water, thereby facilitating the pumping action on the body 1 for discharging water. In addition, the side walls 11 and 12 at body 1, when provided with shallow recesses 20 respectively, further enable the cyclist to hold the water-bottle between his fingers for easily drinking the water.

While embodiments of the invention have been shown and described, the invention is not limited to the specific construction thereof, which is merely exemplary in the specification rather than defined.

What is claimed is:

1. A water-bottle for a bicycle, which is mounted on a down tube of a bicycle frame by a fixing member which permits easy removal of the water-bottle; said down tube having a surface in the form of a circular arc, said water-bottle comprising a body having a spout, and a stopper for opening and closing said spout, said body being provided with a pair of side walls spreading longitudinally and vertically and a connecting wall in continuation of and connecting said side walls, said connecting wall being provided with a front surface portion extending along said down tube and a rear surface portion facing rearwardly of the bicycle, said body having between said sidewalls a narrow thickness defined by said connecting wall, said narrow thickness being less than or equal to a dimension which is slightly larger than an external dimension of said down tube forming with said down tube a streamlined structure having a reduced air resistance, said fixing member having a housing portion in which said front surface portion of said watter-bottle is contained and a retainer for permitting removal of said water-bottle from said housing portion without removing said housing portion from said frame, said housing portion covering a gap between the front surface of said water-bottle and said down tube to reduce air resistance, said connecting wall including an upper surface portion and a lower surface portion, the upper and lower surface portions continuing with said rear surface portion through respective curved surfaces, said upper surface portion and lower surface portion being made horizontal and said front and rear surface portions being inclined and in parallel with each other and with said down tube, said front surface portion being connected to said upper and lower surface portions.

2. A water bottle for a bicycle according to claim 1, wherein said sidewalls near the rear surface portion of said bottle gradually approach one another as the distance from said front surface to said rear surface portion increases, said rear surface portion being formed in a circular arc having a curvature which is smaller than that of said down tube.

3. A water-bottle for a bicycle according to claim 1, wherein said front surface portion of said connecting wall at said body is formed in a concave surface corresponding to the surface of a circular arc of said bicycle frame.

* * * * *